US005958094A

United States Patent [19]

Schwamborn et al.

[11] Patent Number: 5,958,094

[45] Date of Patent: Sep. 28, 1999

[54] CYCLONE COLLECTOR AND CYCLONE CLASSIFIER

[76] Inventors: Karl-Heinz Schwamborn, Bergheimer Str. 42, 53844, Troisdorf, Germany; Ing. H.J. Smigerski, Kohlbergstr. 11, 45770 Marl, Germany

[21] Appl. No.: 08/901,022

[22] Filed: Jul. 25, 1997

[30] Foreign Application Priority Data

Jul. 27, 1996 [DE] Germany .......................... 196 30 472

[51] Int. Cl.[6] .................................................. B01D 47/00

[52] U.S. Cl. ................................ 55/331; 55/336; 55/337; 55/349; 55/458; 55/459.1; 55/463

[58] Field of Search .............................. 55/331, 336, 337, 55/349, 458, 459.1, 459.2, 459.4, 459.5, 463

[56] References Cited

U.S. PATENT DOCUMENTS

| | | | |
|---|---|---|---|
| 3,923,481 | 12/1975 | Farrow | 55/459.4 |
| 4,162,901 | 7/1979 | Enegess | 55/459.4 |
| 4,328,013 | 5/1982 | Godare et al. | 55/459.1 |
| 5,024,684 | 6/1991 | Tank | 55/459.5 |
| 5,042,998 | 8/1991 | Beusen | 55/459.1 |

FOREIGN PATENT DOCUMENTS

| | | | |
|---|---|---|---|
| 34 15 482 A1 | 10/1985 | Germany . | |
| 41 36 935 A1 | 5/1993 | Germany . | |
| 1042810 | 9/1983 | Russian Federation | 55/459.2 |
| 0386215 | 4/1965 | Switzerland | 55/459.1 |

*Primary Examiner*—Jay H. Woo
*Assistant Examiner*—Minh-Chau T. Pham
*Attorney, Agent, or Firm*—Shook, Hardy & Bacon, L.L.P.

[57] ABSTRACT

A cyclone, in particular a cyclone collector and a cyclone classifier having an arrangement disturbing the gas-particle flow in the inlet area of the inlet casing or in the cylindrical part of the housing. This flow disturber effects a deflection and dispersion of the dense material flow, whereby improved separation, in particular of the finest particles, is facilitated without significant reduction damage of the powder collecting efficiency. The flow disturber can be a prism-type flow disturber, a flap of a blowing arrangement.

20 Claims, 13 Drawing Sheets

CYCLONE COLLECTOR AND CYCLONE CLASSIFIER

CROSS-REFERENCE TO RELATED APPLICATIONS

Not Applicable.

STATEMENT REGARDING FEDERALLY SPONSORED RESEARCH

Not Applicable.

REFERENCE TO MICROFICHE APPENDIX

Not Applicable.

SPECIFICATION

Background Of The Invention

This invention relates to a cyclone, in particular a cyclone collector and cyclone classifier with a cylindrical housing in which a cylindrical inlet casing and an inlet duct are disposed.

Cyclone collectors separate powdered materials from gas flows. By tangential inlet of the dust-laden gas flow into the inlet casing a centrifugal acceleration is applied to the solid particles, which directs them against the wall of the cyclone, thereby reducing the solid particle velocity. Solid particles are separated from the gas by their differential speeds. The dedusted gas is guided upwards through an immersion duct, and the separated particles are guided downwards and discharged through a rotary airlock out of the cyclone. Cyclone collectors do not have devices to influence particle size distribution of the discharged powder, although this is often required in the further processing.

When processing solid materials through grinders and dryers, an undesirable amount of very fine dust is generated. This fine dust leads to problems, such as poor flowability or local inhomogeneities, which negatively affect further processing. In particular, the fine particles below 20 $\mu$m create the problems. It is possible to reduce the amount of these fine particles by using air classifiers or special sieving machines.

For economical separation in the range below about 50 $\mu$m, air classifiers operating on the centrifugal principle are preferably used. These cyclone classifiers usually operate in the manner of counterflow centrifugal classifiers, whereby the material to be classified is centrifuged in outward direction against the gas flow which is directed inwards. The fine dust which is carried along by the gas due to its low mass is subsequently separated from the gas in a further dust collector downstream to the cyclone classifier.

In air classification, imprecise classifying cuts are due to the high solid material loads wherein the particles are not well dispersed and enter the classifying zone in dense material flows. Dense material flows are accumulations of solid material particles in a gas flow which are generated due to segregation, e.g., through the effect of gravity or centrifugal force. In cyclone collectors or cyclone classifiers these dense material flows are generated due to spinning action in the inlet casing and are caused by overloading the air with solids. The dense material flow also contains the fine particles below 20 $\mu$m which would have passed the classifier if the dust load were low. To avoid this effect, much larger classifying zones or special secondary air dispersion devices are needed.

SUMMARY OF THE INVENTION

The purpose of the invention is to provide a cyclone which in the case of a cyclone collector can be used for fines removal and in the case of a cyclone classifier can improve the classifying. The invention proceeds from the recognition that targeted disintegration of the dense material flows allows improved classification, in particular the removal of the finest particles, without damaging the cyclone collecting efficiency.

The targeted disintegration according to the invention is achieved by placing at least one arrangement disturbing the gas-particle flow (flow disturber) in the inlet area of the cyclone (in the inlet casing) and/or in the cylindrical part of the housing. The dense material flow forming on the inner circumference of a cyclone collector or cyclone classifier is deflected by this flow disturber and hereby disintegrated into its individual particles. The fine particles are sucked to the center and discharged by the gas flow, whilst the remaining larger particles are directed against the wall by the centrifugal forces and form a new dense material flow. The desired classifying effect for the fine particles can be improved by repetition of the dense material flow dispersion using several flow disturbers placed in series, which may be arranged not only in the area of the inlet casing, but also in the cylindrical part of the housing. The main influencing factors are the location of the prism edge and the angle of incidence of the flow disturber (angle SW or AW). The flow disturber should be so designed and disposed that no space exists between the flow disturber and the housing wall, through which the gas-particle flow can pass without deflection.

DETAILED DESCRIPTION OF THE INVENTION

The purpose of the invention is to provide a cyclone which in the case of a cyclone collector can be used for fines removal and in the case of a cyclone classifier can improve the classifying. The invention proceeds from the recognition that targeted disintegration of the dense material flows allows improved classification, in particular the removal of the finest particles, without damaging the cyclone collecting efficiency.

It is known from Krambrock, W.: *Kritische Anmerkungen zur Untersuchung an Zyklonabscheidern, Chem.-Ing.-Tech.*

51 (1979) No. 5, pp. 493–496 that the dense material flows are disturbed by imprecise fabrication of the inner walls or incorrectly fitted gaskets, which usually result in a decrease of the cyclone collecting efficiency and an increase in the amount of coarser particles in the dedusted clean gas.

The targeted disintegration according to the invention is achieved by placing at least one arrangement disturbing the gas-particle flow (flow disturber) in the inlet area of the cyclone (in the inlet casing) and/or in the cylindrical part of the housing. The dense material flow forming on the inner circumference of a cyclone collector or cyclone classifier is deflected by this flow disturber and hereby disintegrated into its individual particles. The fine particles are sucked to the center and discharged by the gas flow, whilst the remaining larger particles are directed against the wall by the centrifugal forces and form a new dense material flow. The desired classifying effect for the fine particles can be improved by repetition of the dense material flow dispersion using several flow disturbers placed in series, which may be arranged not only in the area of the inlet casing, but also in the cylindrical part of the housing. The main influencing factors are the location of the prism edge and the angle of incidence of the flow disturber (angle SW or AW). The flow disturber should be so designed and disposed that no space exists between the flow disturber and the housing wall, through which the gas-particle flow can pass without deflection.

Cyclone collectors are usually designed to achieve the highest possible powder collecting efficiency which includes also the finest powder particles (viz. Muschelknautz, E., Greif, V. and Trefz, M.: *Druckverlust und Abscheidegrad in Zyklonen, VDI-Wärmeatlas Lja* 1/11, 7th edition, 1994, VDI-Veriag Düsseldorf). So it is surprising to find that by applying a flow disturber, the cyclone could be also used for classification, in particular removal of ultrafine particles.

The flow disturber preferably extends in axial direction at least along the entire height of the inlet casing. This ensures that the dense material flow is caught and dispersed entirely.

Figure 4:
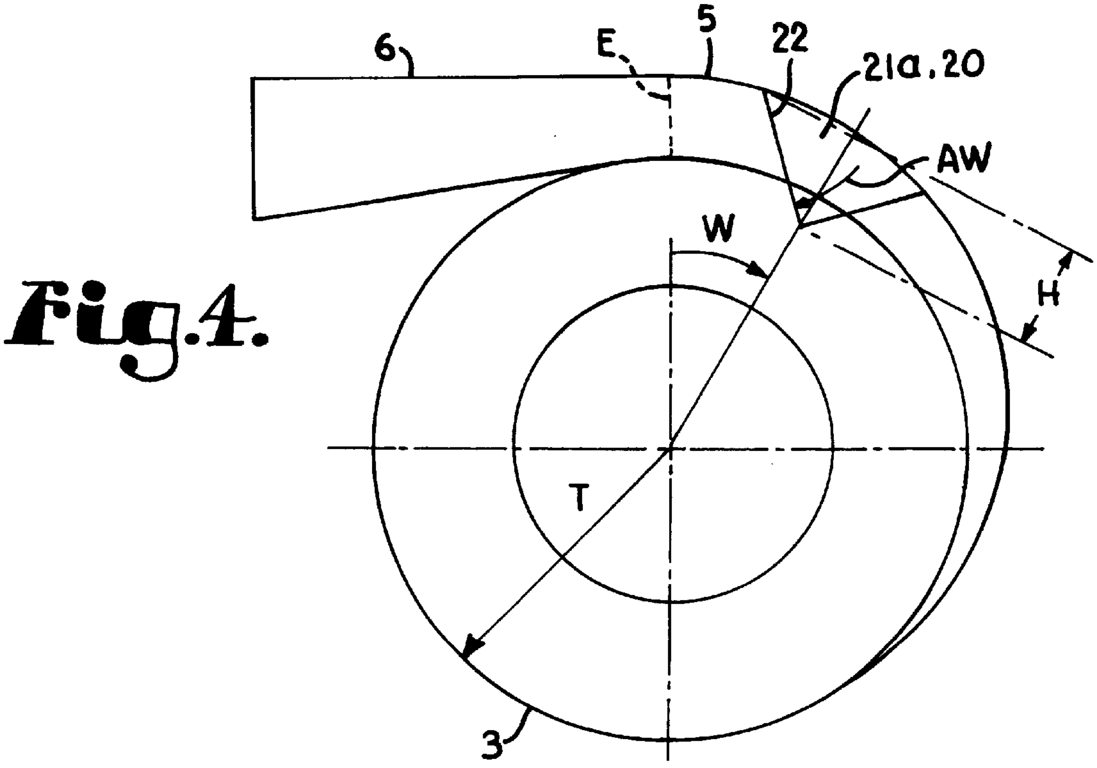
FIG. 4 the presentation according to FIG. 3 with inscribed parameters.

The flow disturber is disposed in an angle range W (angle) between 0 and 360°, preferably 0 to 90°, behind the inlet plane E (EinlaBebene). The inlet plane E is defined as the plane where the inlet duct meets the inlet casing, as shown in FIG. 4. The location of the flow disturber behind the inlet plane has the advantage that the dispersion already begins at an early point and that the dense material flows are therefore deflected and dispersed in the cyclone classifier just before the actual classification, allowing the fine particles which are separated thereby to be sucked out with the gas flow. A preferred area in which the flow disturber can be disposed is the angle sector between 15 and 45° behind the inlet plane E.

According to a first embodiment, the flow disturber is located on the inner wall of the inlet casing and/or the cylindrical housing part. This flow disturber may be a prism, preferably a rectangular trilateral prism, e.g., a prism whose cross section area is a right-angled triangle. The base angle AW which defines the inclination angle of the lateral prism surface which meets the gas-particle flow is preferably 30 to 60°. The radial extension H (height) of the displacement body is advantageously 5 to 60% of the inner radius of the cylindrical part of the housing and substantially depends on the inlet velocity of the gas-particle flow and the centrifugal forces in the cylindrical housing which are determined therefrom. The prism edge may be disposed in parallel with the longitudinal axis of the cyclone or also in an inclined position in relation to the longitudinal axis.

According to a second embodiment, the flow disturber comprises a flap which is pivotable into the interior of the inlet casing and/or the cylindrical part of the housing. This flap is preferably pivotable around an axis extending in parallel with the longitudinal axis of the cyclone, whereby the angle of traverse SW (Schwenkwinkel) may be 10° to 170°, preferably 30° to 90°. The flap edge may also be executed at the angle $NW_2$ (Neigungswinkel) in relation to the longitudinal axis of the cyclone. The length L of the flap, like the size H of the flow disturber, depends on the conditions of the gas-particle flow and is preferably in the range of 5 to 60% of the inner radius of the cylindrical part of the housing. Instead of a rectangular flap, the baffle can be executed with an inclined edge, so that the edge forms an angle $NW_1$ with the longitudinal axis of the cyclone.

The advantage of the pivotable flap is that it can be adjusted to the specific conditions of the gas-particle flow even in operation and does not require disassembling and reassembling of different flow disturbers.

Similar flexibility is provided by a third embodiment, wherein the flow disturber comprises a blowing arrangement. This blowing arrangement generates a gas flow directed inwards under a blowing angle BW (Blaswinkel), whereby this angle BW is also preferably adjustable. Adaptation to different gas-particle flows can also be effected through the gas pressure resp. the gas flow velocity. Gas outlet velocities in the order of 100 m/s should preferably be set to ensure sufficient dispersion of the dense material flow. The blowing arrangement preferably has at least one air blowing duct disposed on the inner side of the inlet casing and/or the cylindrical part of the housing. This air blowing duct may be disposed in fixed position or, advantageously, pivotably in the angle BW 10° to 170° around an axis extending in parallel with the longitudinal axis of the cyclone. The air blowing duct has at least one air jet nozzle and/or air jet slit.

At least one air blowing chamber can be disposed in place of an air blowing duct on the outer side of the inlet casing and/or the cylindrical part of the housing. In this case, no installations are needed inside the cyclone. The blowing chamber is connected to the interior of the cyclone by at least one air jet nozzle and/or air jet slit disposed in the wall of the inlet casing. Both the air blowing chamber and the air blowing duct may be inclined by an angle $NW_1$ in relation to the longitudinal axis of the cyclone.

Exemplary embodiments of the invention are now described in more detail by reference to the drawings.

Figure 1:
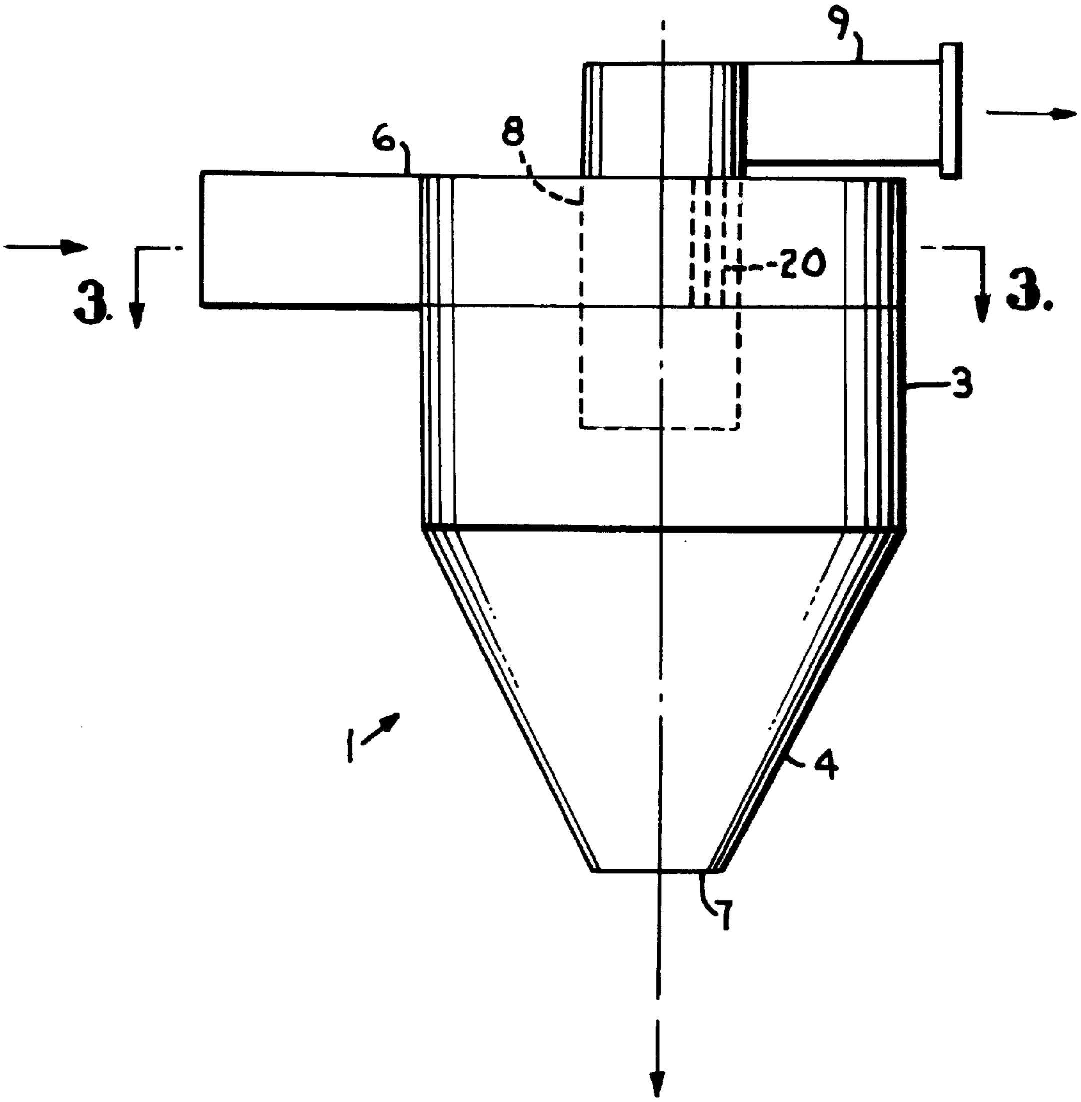
FIG. 1 a cyclone collector on longitudinal section.

FIG. 1 is a schematic presentation of a cyclone collector 1 in longitudinal section. The cyclone collector 1 comprises a cylindrical part of housing 3 which passes over into a conical part of housing 4. The inlet casing 5 to which the inlet duct 6 is connected forms part of the cylindrical part of housing. An immersion duct 8 is disposed in the center. The gas flow loaded with particles flows through the inlet duct 6 into the interior of the cyclone collector 1, whereby a centrifugal acceleration is imparted to the solid material particles by the tangential inflow. A separation of solid material and gas takes place, whereby the dedusted gas is directed upwards through the immersion duct 8 and through the upper outlet duct 9. The separated particles are discharged through the lower discharge opening 7.

A flow disturber 20 is shown inside the inlet casing 5. In FIG. 1, however, this flow disturber 20 cannot be seen because the immersion duct 8 is located in front of it. This flow disturber 20 is described in more detail in connection with FIGS. 3 and 4.

Figure 2:
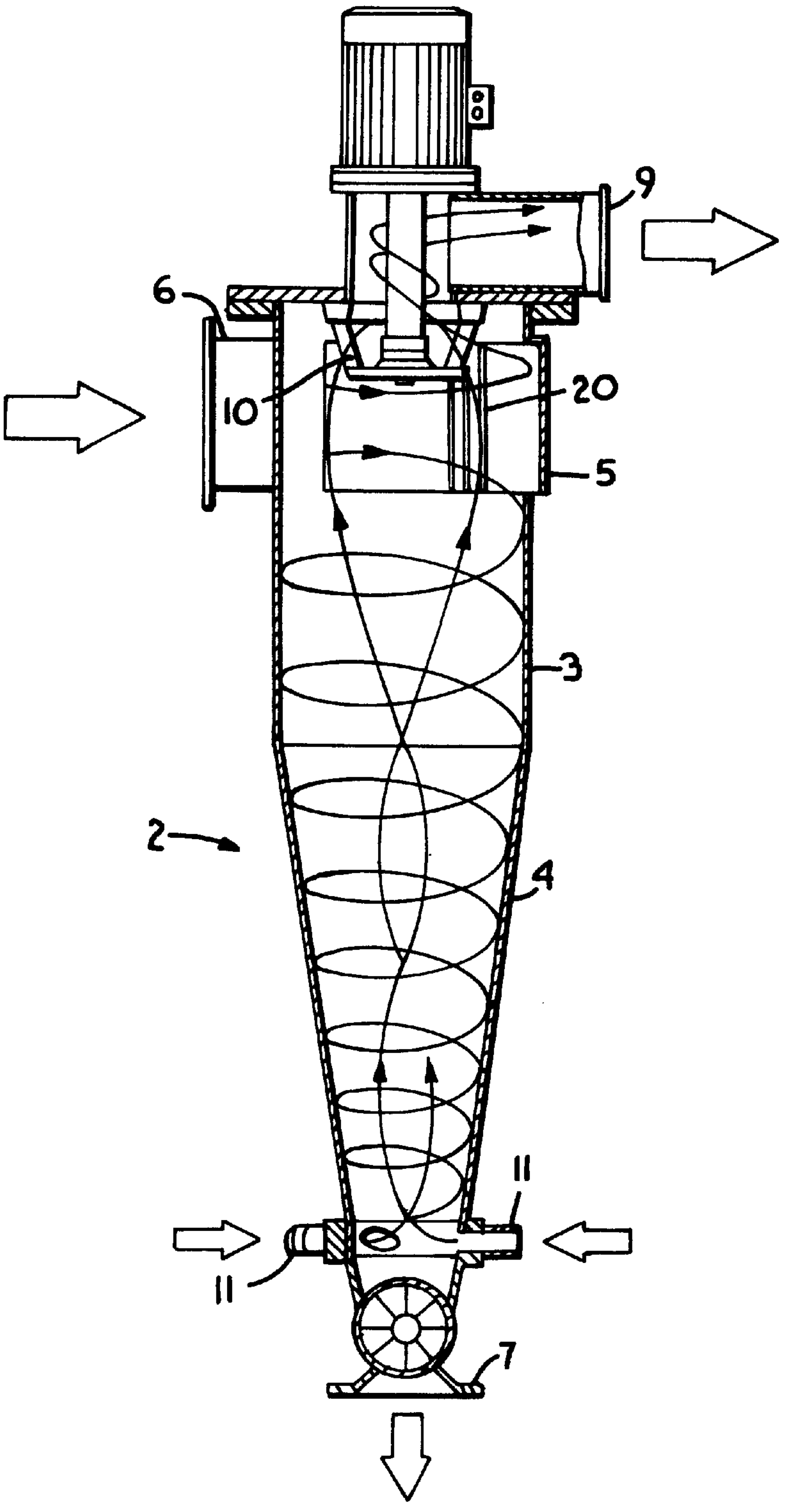
FIG. 2 a cyclone classifier in longitudinal section.

FIG. 2 shows a cyclone classifier 2 which also comprises a cylindrical part of housing 3 and a conical part of housing 4. In place of an immersion duct, a classifier rotor 10 is disposed in the cyclone classifier. Two secondary air nozzles 11 from which the secondary air flows upwards inside the cyclone classifier 2 and carries the fine particles in the direction of the classifier rotor 10, where the classification of the particles takes place, are furthermore provided in the lower section of the conical part of housing 4. The cyclone classifier 2 also comprises an inlet duct 6 and an inlet casing 5 in which a flow disturber 20 is disposed.

Since the flow disturber 20 for the cyclone collector and the cyclone classifier are of the same construction, the following comments in connection with FIGS. 3 to 8 apply to both devices.

Figure 3:
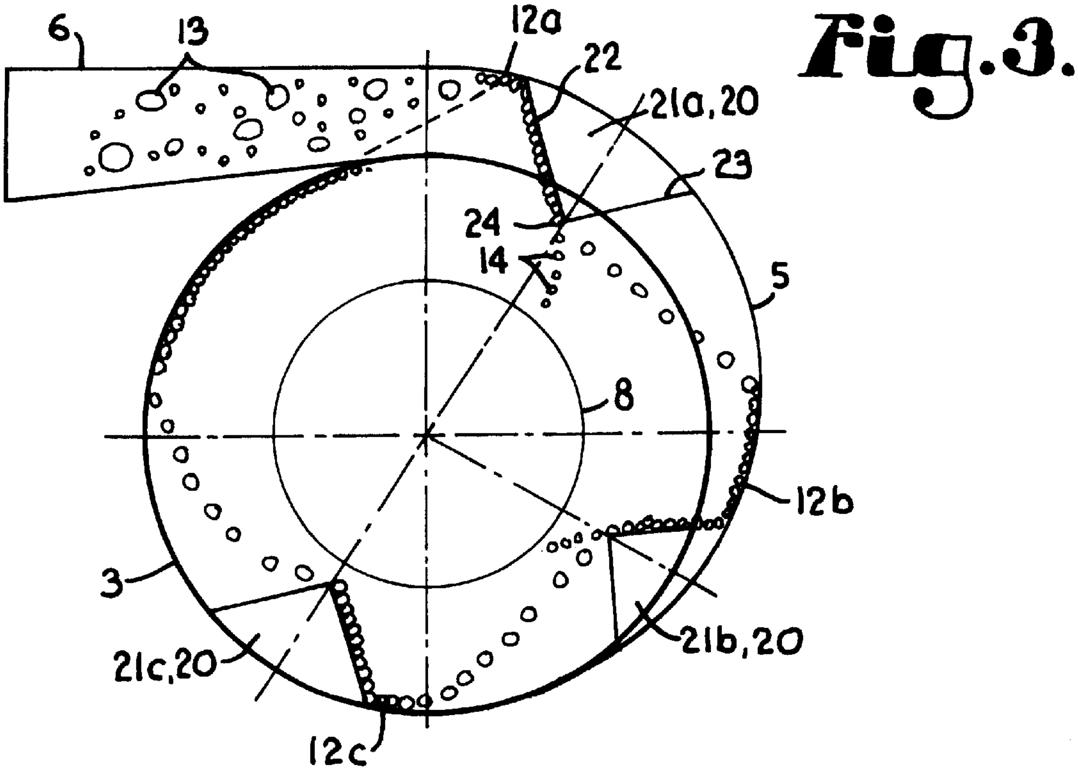
FIG. 3 a horizontal section through the cyclone collector shown in FIG. 1 along the line III—III, but with a total of three flow disturbers.

FIG. 3 shows a horizontal section through the cyclone classifier according to FIG. 1 along the line III—III. By deviation from FIG. 1, a total of three flow disturbers 21*a*–21*c* are provided, which are distributed along the circumference in the inlet casing 5 and in the cylindrical part of the housing 3. The flow disturbers 21*a*–21*c* are straight trilateral prisms having the lateral surfaces 22 and 23 and a prism edge 24. The gas-particle flow with the coarse particles 13 and the finer particles 14 which enters through inlet duct 6 concentrates into a dense material flow 12*a* which is deflected by the lateral surface 22 of the flow disturber 20 disposed in the inlet area. This dense material flow 12*a* is dispersed into its individual particles, whereby the fine particles 14 are caught by suction with the inward-bound gas flows. The remaining particles are directed against the wall of the inlet casing 5 again by the centrifugal forces and are forming there a new dense material flow 12*b*, which is again dispersed by the second flow disturber 21*b* in the same manner. In the further process, a third dense material flow 12*c* is then formed which is again deflected and dispersed by the third flow disturber 21*c*.

FIG. 4 shows the section according to FIG. 3 without the gas-particle flow and without the two flow disturbers 21*b* and 21*c*. The first flow disturber 21*a* is disposed in a spaced position in relation to the inlet plane E under the angle W on the inner side of the inlet casing 5. The lateral surface 22 forms the base angle AW with the base of the flow disturber 21*a*, whereby this base angle AW is 45° in the embodiment shown in this figure. The radial extension of the flow disturber 21*a* is shown by the size H and is about 25% of the inner radius r of the cylindrical part of the housing 3.

Figure 5A:
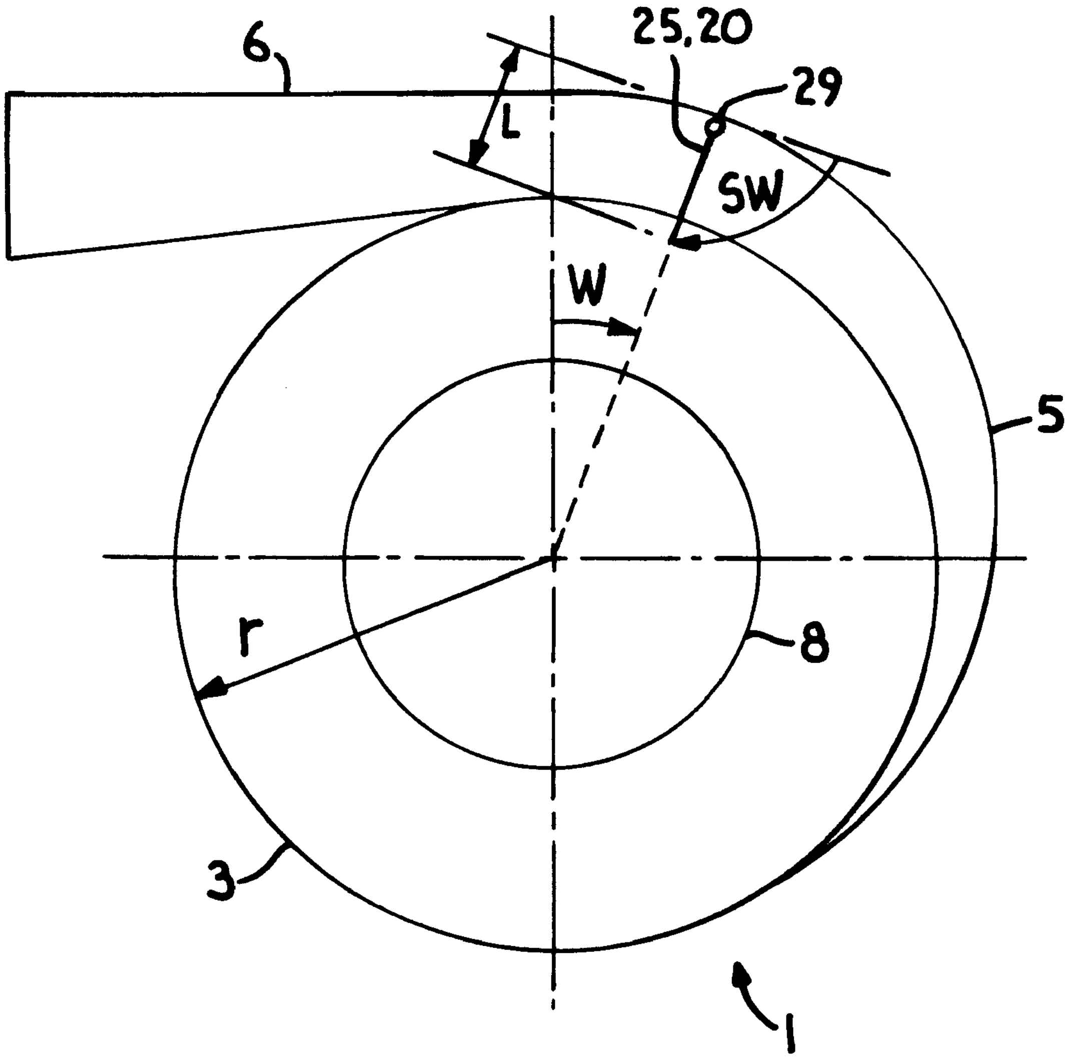
FIG. 5*a* a horizontal section through a cyclone collector according to a further embodiment.

FIG. 5*a* shows a further embodiment in a horizontal section through a cyclone collector 1. A flap type flow disturber 25 is provided in place of the prism type flow disturber 21, whereby said flap 25 is also disposed on the inlet casing 5 under the angle W. The flap 25 is disposed to be pivotable around the vertical axis 29, so that the pivot angle SW can be set as desired. The radial extension of the flap 25 is indicated by the length L. Here, too, the length L is approximately 25% of the inner radius of the cylindrical part of housing 3. The pivot angle SW can preferably be variably set between 0° and 90°.

Figure 5B:
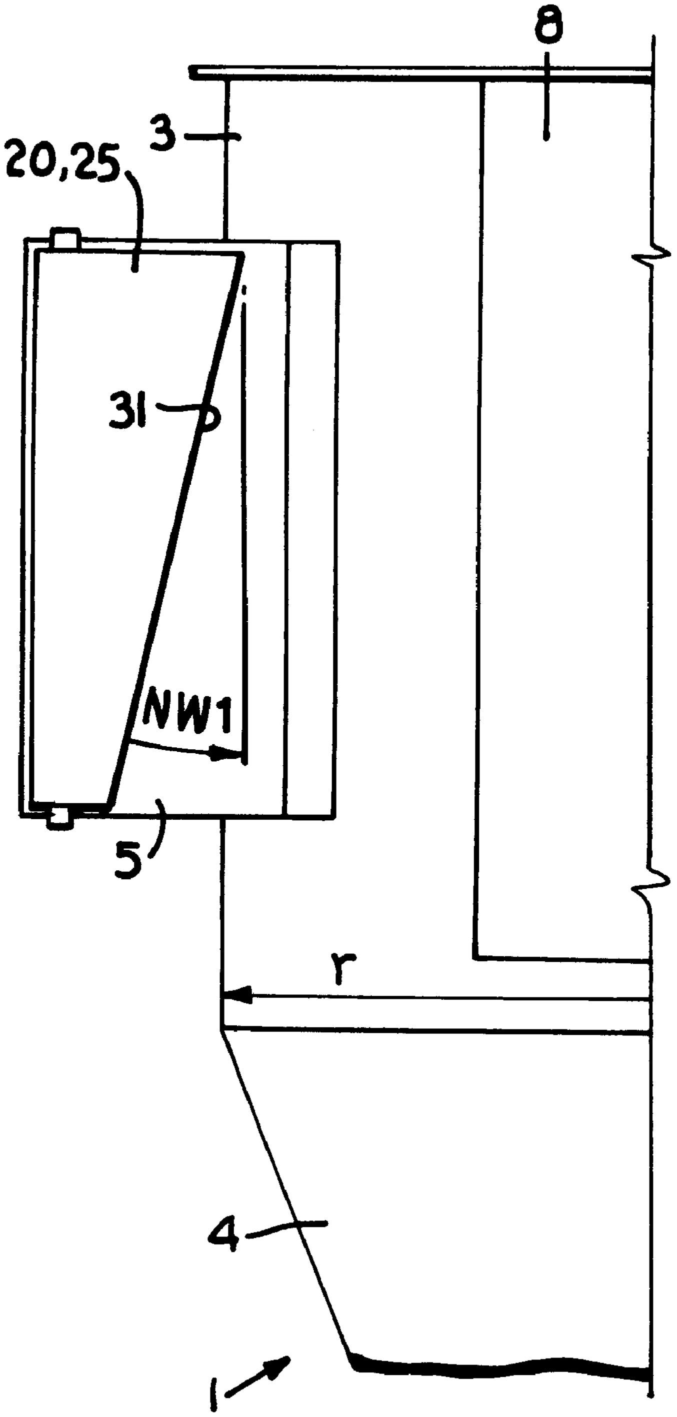
FIG. 5*b* a cyclone in longitudinal section according to a further embodiment.

FIG. 5*b* shows a cyclone collector 1 in longitudinal section, which comprises a flap 25 as the flow disturber, which is pivotable around the axis 29. The flap edge 31 is executed in an inclination angle $NW_1$ in relation to the longitudinal axis 15 of the cyclone 1. For adaptation to the geometry of a classifier rotor the flap 25 may be wider at the bottom than at the top and could be put in upside down position versus mounting position shown in FIG. 5*b*.

Figure 5C:
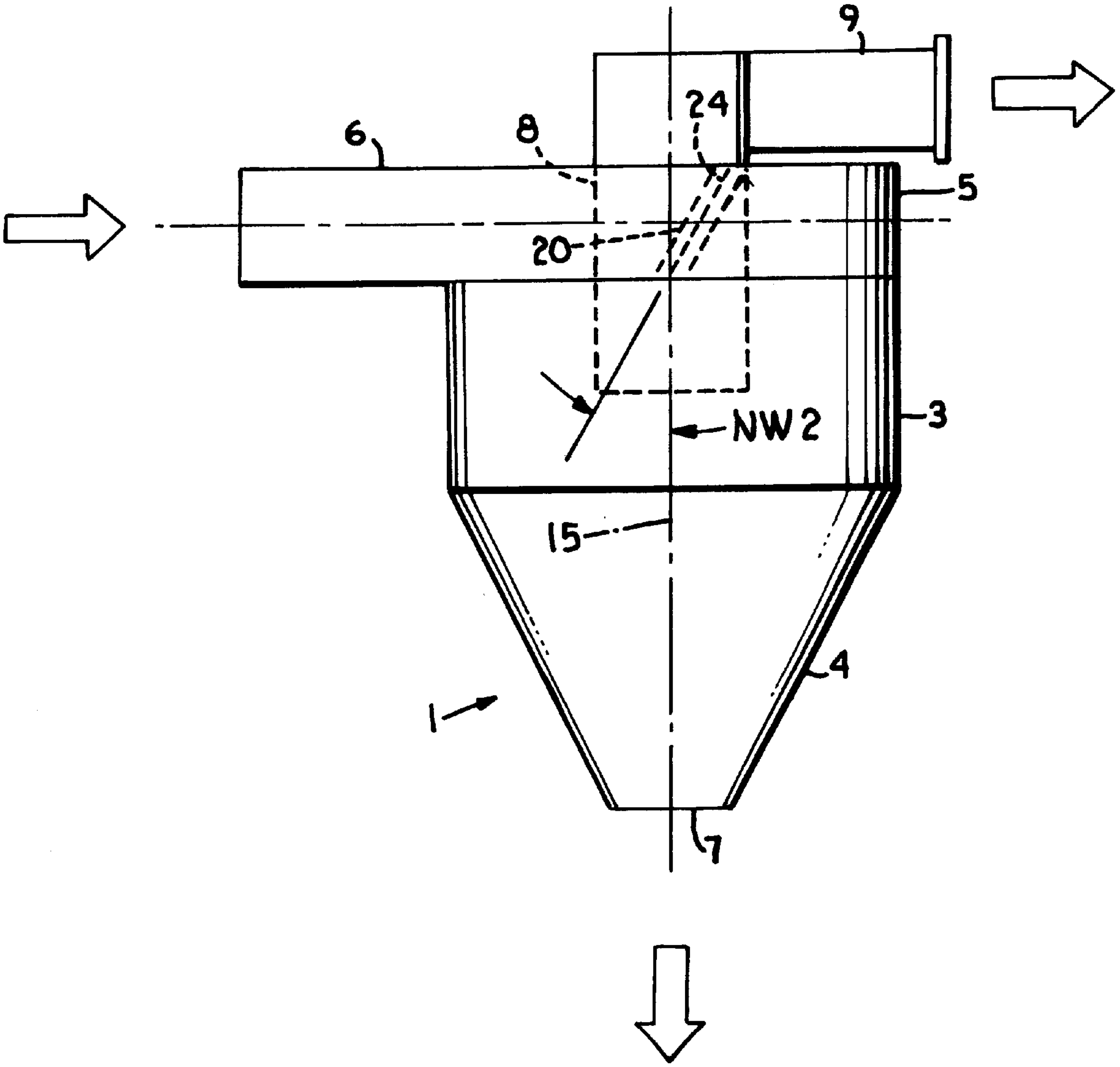
FIG. 5*c* a cyclone collector in longitudinal section according to a further embodiment.

FIG. 5*c* shows a cyclone collector 1 in longitudinal section corresponding to that shown in FIG. 1. The flow disturber 20 is disposed in inclined position in relation to the longitudinal axis 15 of the cyclone, so that the prism edge 24 forms an angle $NW_2$.

Figure 6:
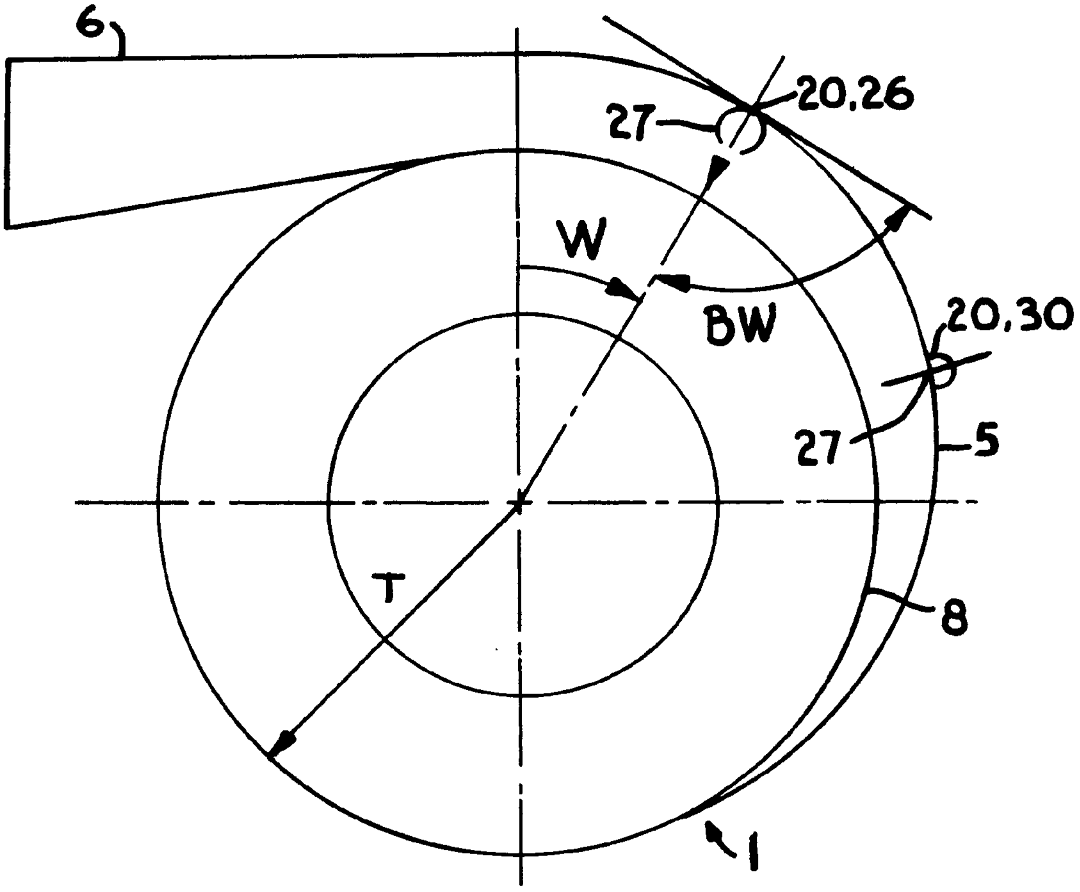
FIG. 6 a horizontal section through a cyclone according to a further embodiment.

FIG. 6 shows a further embodiment in which the flow disturber 20 is in the form of a blowing arrangement. An air blowing duct 26 is disposed on the inner side of the inlet casing 5, whereby said air blowing duct 26 is pivotable around its longitudinal axis, which extends in parallel with the longitudinal axis of the cyclone collector 1, so that the air opening of the air blowing duct, which in this figure is an air jet slit 27, can be pivoted around the blowing angle BW (Blaswinkel). A gas is introduced through the air blowing duct under a predetermined pressure, which issues through the air jet slit 27 and hence generates an inward-bound gas flow which disperses the dense material flow generated on the inner side wall of the inlet casing 5.

Alternatively an air blowing chamber 30, which is connected to the interior of the cyclone through a corresponding air jet slit 27 in the wall of the inlet casing 5, can also be disposed on the outer side of the inlet casing 5. Adjustment of the blowing angle is not possible in this case and the flow direction is radially inwards.

Figure 7A:
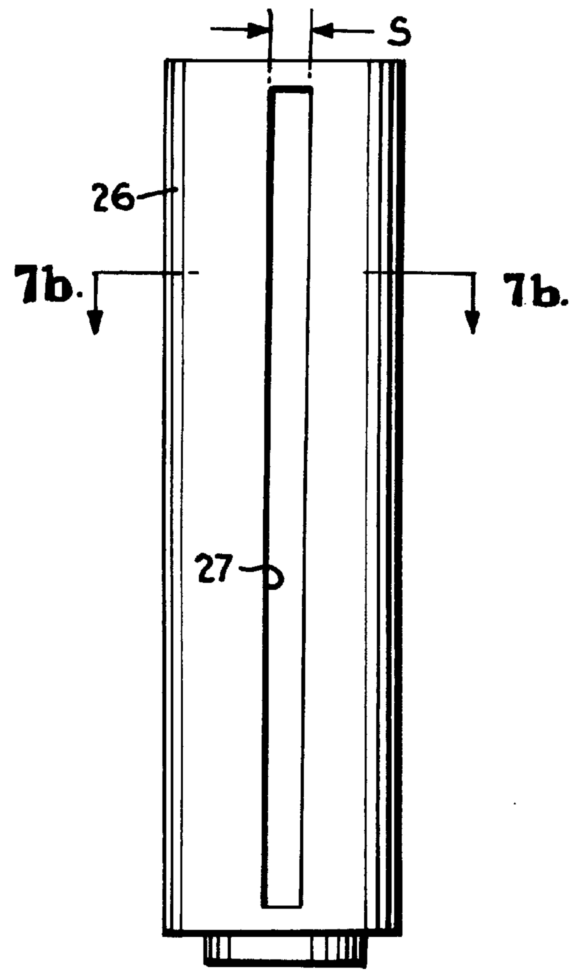
FIGS. 7 and 8 detailed presentations of the air blowing duct of the embodiment according to FIG. 6
Figure 7B:
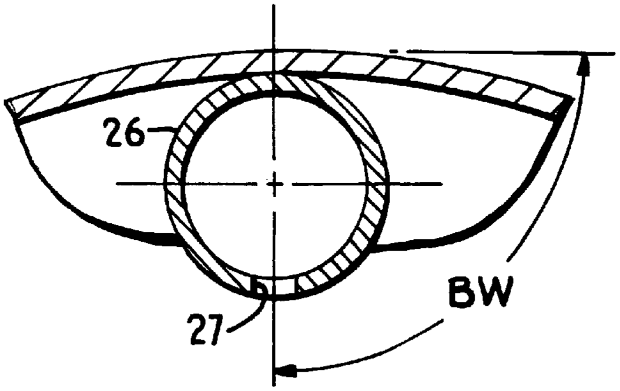
Figure 8A:
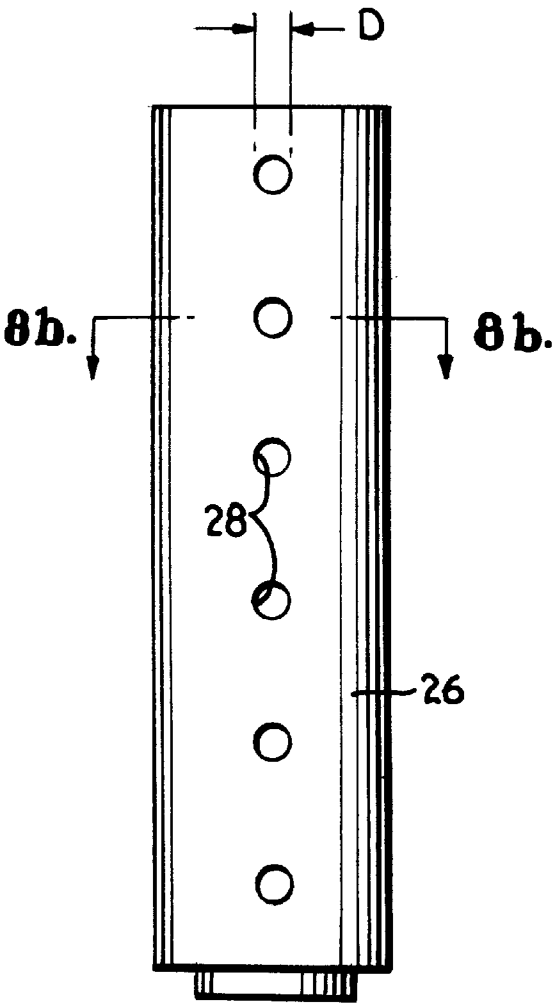
Figure 8B:
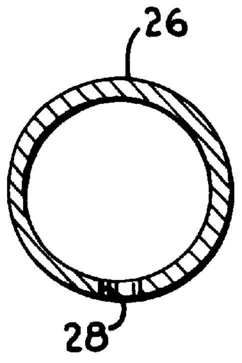

FIGS. 7 and 8 show detailed execution of the air blowing duct 26. The air jet slit 27 extends along almost the entire length of the air blowing duct 26.

FIG. 8 shows the air blowing duct with a number of air jet nozzles 28 in vertical arrangement.

In the following Examples 1 to 3, a cyclone collector 1 according to FIG. 1 was used which had an inner radius r of 0.5 m. A prism type flow disturber 21*a* was used to deflect the dense material flow 12*a*.

EXAMPLE 1

The cyclone collector of conventional construction in FIGS. 1 and 3 which is operated downstream to a grinding machine for collection of the powder coating material with an air flow of 6360 $m^3/h$ and a powder flow of 1020 kg/h. The specific gravity of the powder is 1700 $kg/m^3$. Without a flow disturber a total powder collection efficiency of 99% is measured, i.e. 99% of the powder coming from the grinder is collected and discharged as a useful product. The remaining fine dust of 1% is collected in a bag filter downstream to the cyclone. While the amount of fines below 10 microns in the feed material to the cyclone was 9.9%, it was reduced to 9.0% in the discharged end product.

EXAMPLE 2

The cyclone collector according to Example 1 is fitted with a flow disturber 20 according to FIG. 3. The radial height of this prism type flow disturber is H=30 mm at a base angle of AW=45°. The total powder collection efficiency falls from 99% to 98%. The fine dust content<10 μm in the end product was reduced form 9.0% down to 8.6%.

EXAMPLE 3

Cyclone collector with a flow disturber according to Example 2, but with a radial height of the prism type flow disturber of H=90 mm. The total powder collection efficiency falls to 97%. The fine dust content<10 μm in the end product falls from 8.6% to 7.5%.

The effectiveness of the measure becomes particularly evident when considering the relative decline of the fine dust content<10 μm. Whereas in Example 1 the decline is merely from 9.9 to 9.0%, i.e. a relative decline of 9%, in Example 2 the decline rises to 13% and in Example 3 to 25%. A relative decline of 10 to 20% usually already results in a significant improvement of the powder quality.

Figure 9:
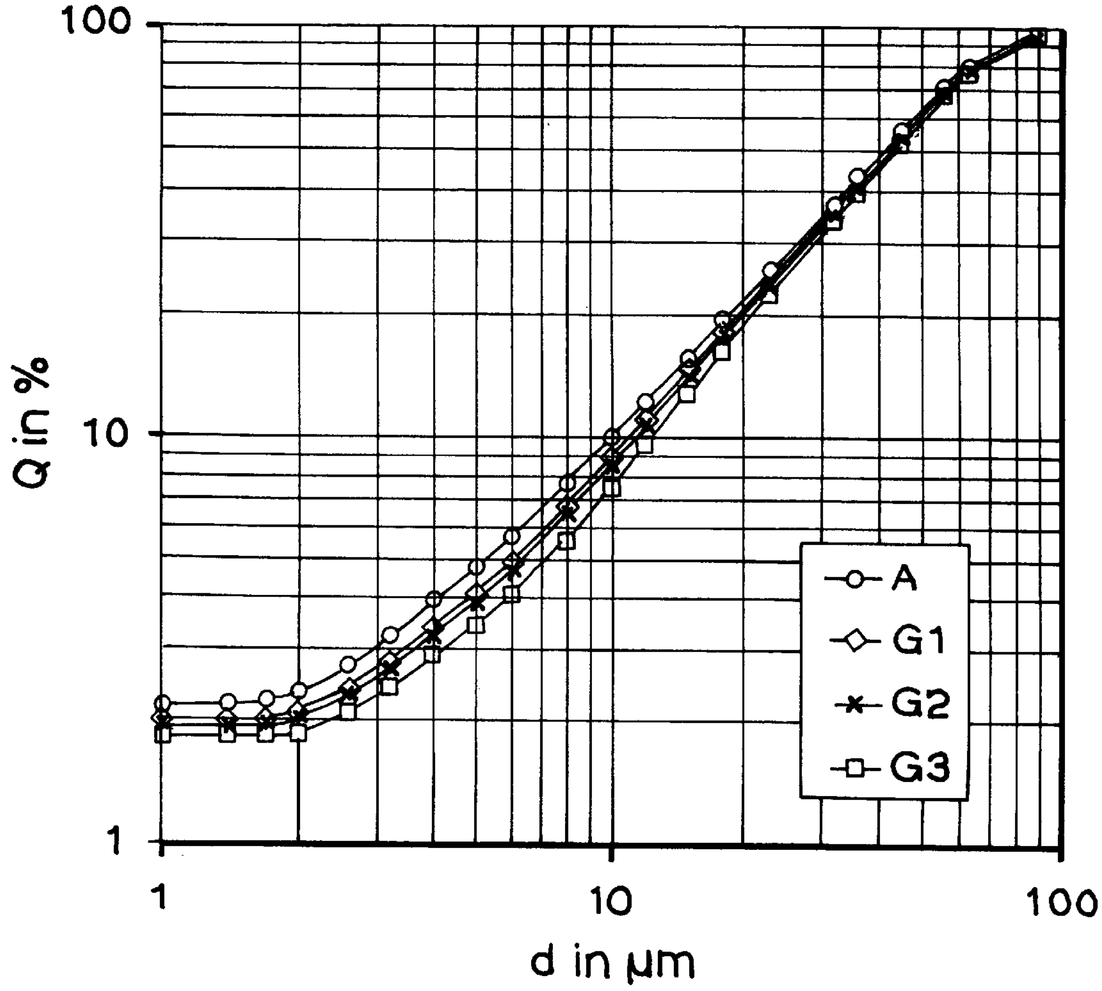
FIG. 9 a diagram of several cumulative particle size distribution curves based on volume.
Figure 10:
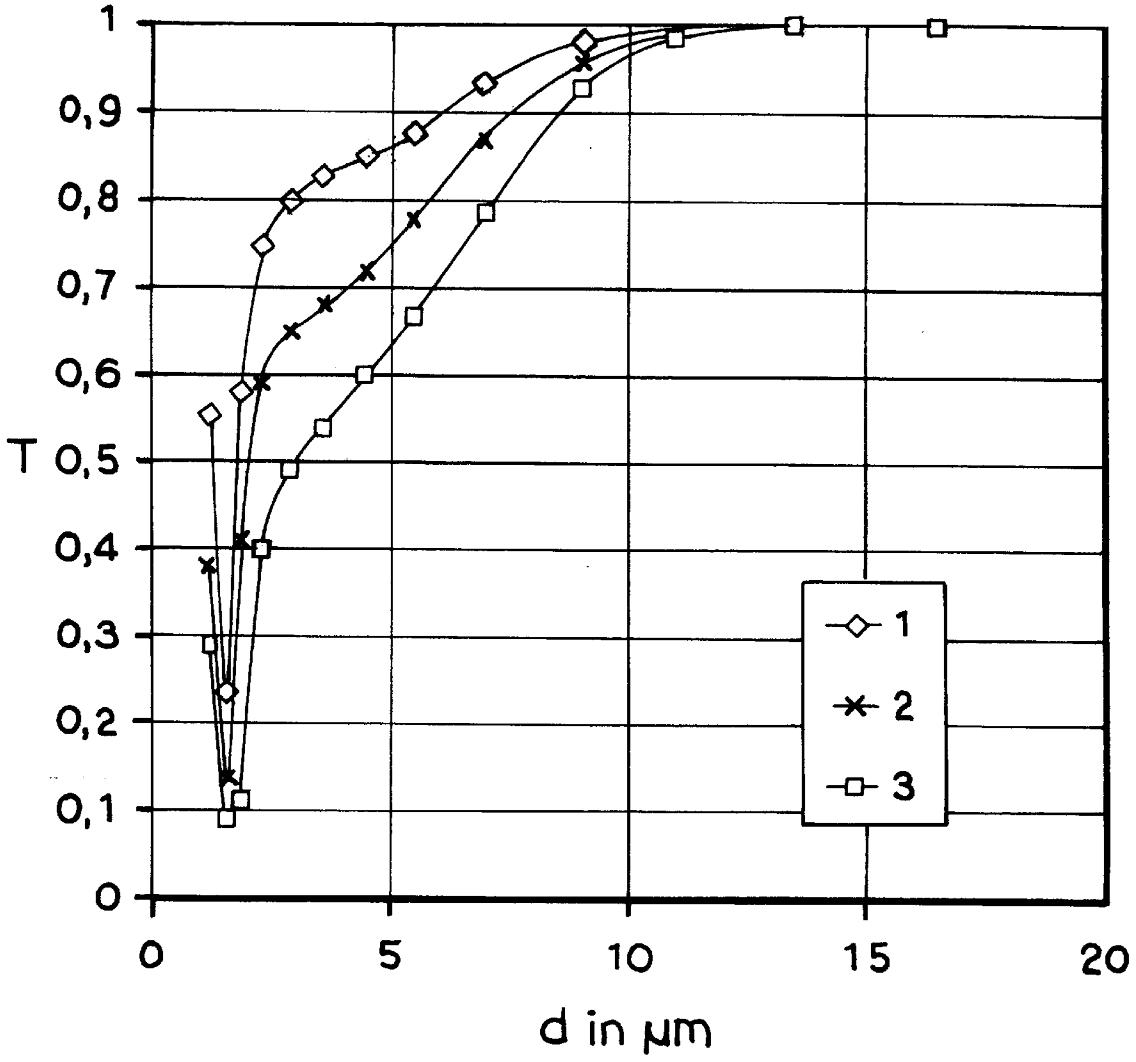
FIG. 10 grade efficiency curves for a cyclone collector.

The associated particle size distributions and grade efficiency were determined in accordance with DIN 66 142, Part 1, with laser diffraction spectrometers of the company CILAS with measuring ranges between 1 and 192 resp. 0.7 and 400 $\mu$m in aqueous suspension. FIG. 9 shows the cumulative particle size distribution curves Q(d) based on volume. The upper curve represents the material to be treated A (feed material). It shows how the particles<10 $\mu$m in the collected end product G1 to G3 decline. The decline of the fine dust is even more evident in FIG. 10, in which the grade efficiency curves T(d) are inscribed. They show that the proportion of 5 $\mu$m particles in the material to be treated can be reduced from about 86% to 64% in the coarse material. This is equivalent to a relative decline of about 25%.

The other examples with a conventional commercial apparatus which can be operated both as a cyclone collector and as a cyclone classifier serve to demonstrate the effectiveness of dense material flow dispersion. Instead of a prismatic flow disturber, a flap 25 which is adjustable from outside is used here (FIG. 5). The pivot angle SW is measured starting from the tangent line on the housing wall.

The following examples were all performed using limestone powder with a specific gravity of 2600 kg/m$^3$ under an air flow of 2400 m$^3$/h and a solid material flow of 480 kg/h.

EXAMPLE 4

The sketched cyclone collector according to FIG. 2 is operating without a flap type flow disturber. The total powder collecting efficiency is 92.3%. The relevant fine dust content<12 $\mu$m of 38.4% in the material to be processed falls to 36.6%, which is equivalent to a relative decline of 5%.

EXAMPLE 5

Cyclone collector according to Example 4, but with a flap length L=90 mm and a pivot angle of SW=60°. The total powder collection efficiency falls to 84.6%. The fine dust content<12 $\mu$m falls to 35%, which is equivalent to a relative decline of 9%.

EXAMPLE 6

The apparatus according to FIG. 2 with a classifying rotor was used as the cyclone classifier. The rotational speed of the rotor of 3230 R/min was the same in all examples. Without the rotor effect, the total powder collection efficiency is 87.6%. The fine dust content<12 $\mu$m is reduced to 31.3% which corresponds to a relative decline of 18%.

Cyclone classifier according to Example 6, but with a flap length of L=90 mm and a pivot angle of SW=60°. The total powder collection efficiency falls to 81.2%. The fine dust content<12 $\mu$m falls to 27.4%, which corresponds to a relative decline of 29%.

EXAMPLE 7

Cyclone classifier according to Example 6, but with a flap length of L=90 mm and a pivot angle of SW=45°. The total powder collection efficiency falls to 84.0%. The fine dust content<12 $\mu$m falls to 27.0%, which corresponds to a relative decline of 30%.

EXAMPLE 8

Cyclone classifier according to Example 7, but with a flap length of L=90 mm and a pivot angle of SW=60°. The total powder collection efficiency falls to 81.2%. The fine dust content, 12 $\mu$m falls to 24.3%, which corresponds to a relative decline of 37%.

A comparable reduction of the fine dust content would also be achieved if a part of the classifier air was used in the form of secondary air to flush the coarse material at the classifier outlet (FIG. 2).

EXAMPLE 9

Cyclone classifier according to Example 6, but with a secondary air content of 5%. The total powder collection rate is 84.8%. The fine dust content<12 $\mu$m falls to 27.4%, which correspond to a relative decline of 29%.

EXAMPLE 10

Cyclone classifier according to Example 9, but with a secondary air flow rate of 10% from total air flow. The powder collection efficiency falls to 81.2%. The fine dust content<12 $\mu$m falls to 24.4%, which corresponds to a relative decline of 37%.

Figure 11:
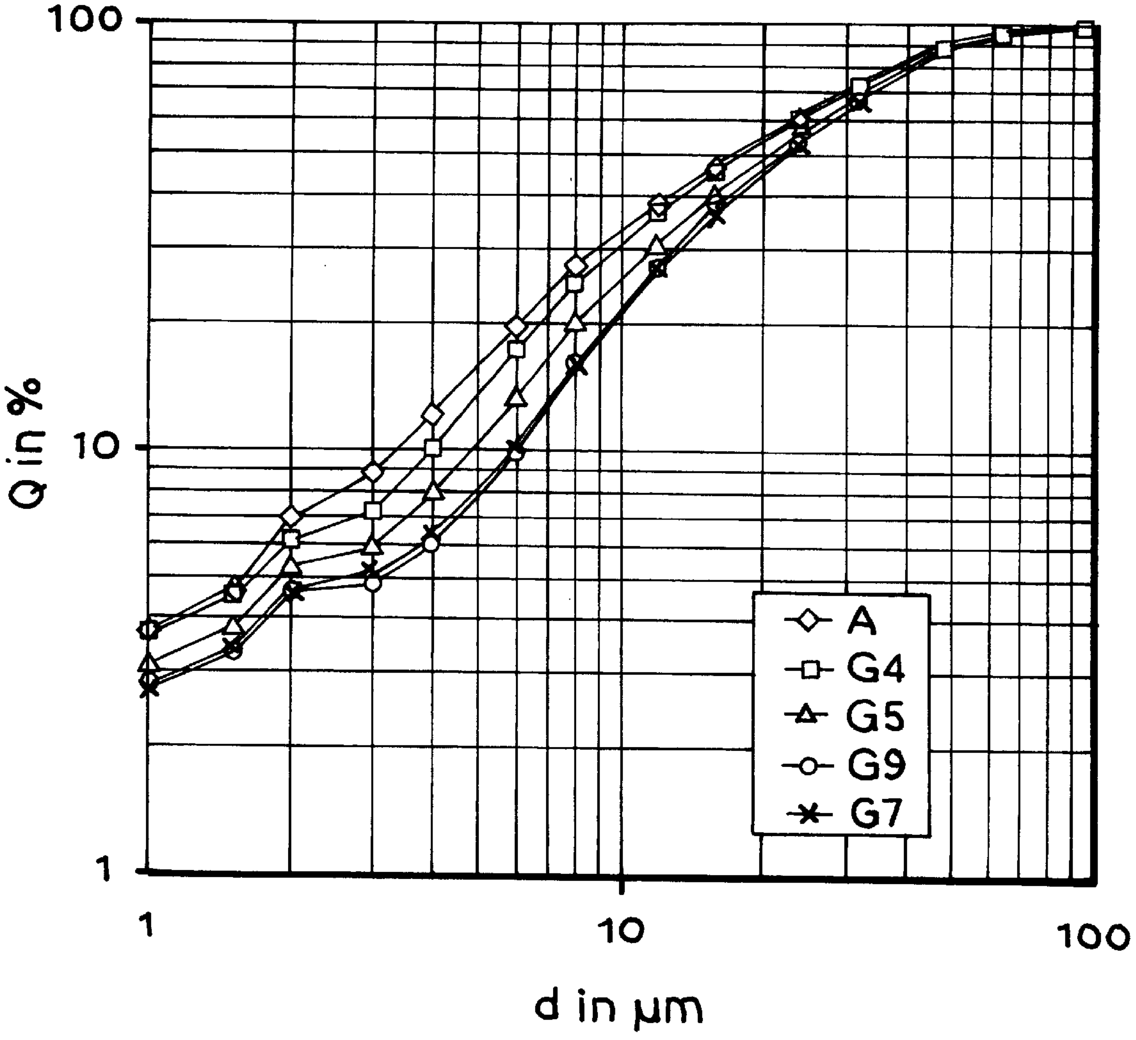
FIG. 11 a diagram showing several cumulative particle size distribution curves based on volume.
Figure 12:
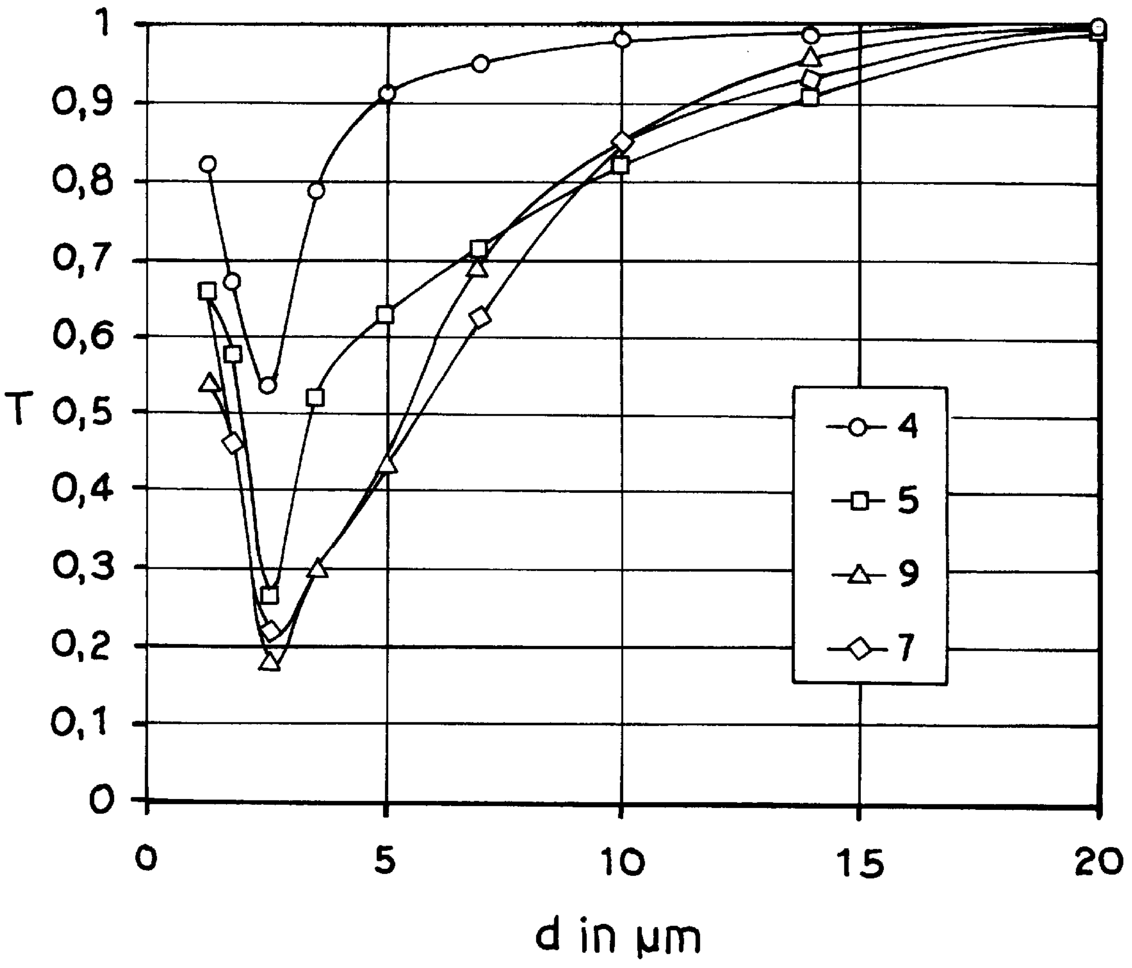
FIG. 12 grade efficiency curves for a cyclone classifier.

The particle size distribution curves Q(d) and grade efficiency curves (T(d) are shown in FIGS. 11 and 12. Curve A represents the same material to be processed as in examples 1 to 3. Here, too, it can be seen how the particles<20 $\mu$m in the coarse material G4 to G9 decline. FIG. 12 again shows very clearly the decline of e.g. the 5 $\mu$m particles under operation as a cyclone collector from about 90% (Example 4) to 62% (Example 5). The decline is even greater under cyclone classifier operation (to about 45%, Examples 7 and 9). The relative decline is far greater at 30 resp. 50%.

Compared to the application of secondary air, the use of flow disturbers has the advantage that the dense material flow is dispersed just before the actual classifying zone and that the coarse material is not recycled only at the bottom part of the cyclone without the associated risk of particle abrasion and electrostatic charging (Galk, J. and W. Peukert: *Classifier for Inline and Offline Classification, powder handling & processing,* vol. 8, No. 1. January/March 1996, p. 5/58).

Other modifications and variations will be apparent to those skilled in the art and are intended to be within the scope of the appended claims.

What is claimed is:

1. A cyclone for separating solid particles from a gas flow comprising:

a cylindrical housing having a generally upright central axis and an internal cylindrical surface extending around said axis;

a casing defining a hollow gas inlet duct mounted on said housing, said hollow duct having a dimension that is parallel to said axis and being positioned for directing a flow of gas containing entrained solid particles along a path extending around said surface; and a gas flow disturber mounted on said surface in said path, said disturber being arranged and positioned to cause said gas to first flow inwardly toward said axis and then outwardly toward said surface, said inward and outward flow causing disintegration of at least a portion of the entrained solid particles.

2. A cyclone as set forth in claim 1, wherein said disturber extends in a direction longitudinally of said axis at least along the entire extent of said dimension.

3. A cyclone as set forth in claim 1, wherein said cyclone comprises a plurality of said disturbers spaced uniformly around said surface.

4. A cyclone as set forth in claim 1, wherein said disturber is disposed adjacent a point where said duct and said surface coincide.

5. A cyclone as set forth in claim 4, wherein said disturber includes a face disposed at an angle in the range of from about 0 to about 90 degrees relative to a plane parallel to and intersecting said axis and extending radially therefrom through said point.

6. A cyclone as set forth in claim 5, wherein said range is from about 15 to about 45 degrees.

7. A cyclone for separating solid particles from a gas flow comprising:

a cylindrical housing having a generally upright central axis and an internal cylindrical surface extending around said axis;

a casing defining a hollow gas inlet duct mounted on said housing, said hollow duct having a dimension that is parallel to said axis and being positioned for directing a flow of gas containing entrained solid particles along a path extending around said surface; and a prism gas flow disturber mounted on said surface in said path, said disturber being arranged and positioned to cause said gas to first flow inwardly toward said axis and then outwardly toward said surface, said inward and outward flow causing disintegration of at least a portion of the entrained solid particles.

8. A cyclone as set forth in claim 7, wherein said prism gas flow disturber is a rectangular, trilateral prism.

9. A cyclone as set forth in claim 7, wherein the inclination angle measured radially between a plane parallel to a base of said prism and a plane running parallel to a side of said prism is in the range of from about 30 degrees to about 60 degrees.

10. A cyclone as set forth in claim 7, wherein a height measured from a base of said prism to a point where two remaining sides of said prism meet is in the range of from about 5 percent to about 60 percent of an inner radius of said cylindrical housing measured between said axis and said internal cylindrical surface along a longitudinal plane running parallel to said axis and intersecting said axis.

11. A cyclone for separating solid particles from a gas flow comprising:

a cylindrical housing having a generally upright central axis and an internal cylindrical surface extending around said axis;

a casing defining a hollow gas inlet duct mounted on said housing, said hollow duct having a dimension that is parallel to said axis and being positioned for directing a flow of gas containing entrained solid particles along a path extending around said surface; and a flap gas flow disturber mounted on said surface in said path, said disturber being arranged and positioned to cause said gas to first flow inwardly toward said axis and then outwardly toward said surface, said inward and outward flow causing disintegration of at least a portion of the entrained solid particles and wherein said flap gas flow disturber is pivotable into said interior surface.

12. A cyclone as set forth in claim 11, wherein said flap gas flow disturber is pivotable about a longitudinal axis running parallel to said central axis and through a point where said flap gas flow disturber is disposed to said internal cylindrical surface.

13. A cyclone as set forth in claim 11, wherein said flap gas flow disturber is disposed at an angle in the range of from about 10 degrees to about 170 degrees relative to a longitudinal plane tangential to said cylindrical housing at a point of attachment of said flap gas flow disturber and a plane running parallel to said axis, said angle extending radially therefrom through said tangential plane.

14. A cyclone as set forth in claim 11, wherein a length of said flap gas flow disturber is in a range of from about 5% to about 60% of an inner radius of said cylindrical housing measured between said axis and said internal cylindrical surface along a longitudinal plane running parallel to said axis and intersecting said axis.

15. A cyclone for separating solid particles from a gas flow comprising:

a cylindrical housing having a generally upright central axis and an internal cylindrical surface extending around said axis;

a casing defining a hollow gas inlet duct mounted on said housing, said hollow duct having a dimension that is parallel to said axis and being positioned for directing a flow of gas containing entrained solid particles along a path extending around said surface; and a blowing arrangement gas flow disturber mounted on said surface in said path, said disturber being arranged and positioned to cause said gas to first flow inwardly toward said axis and then outwardly toward said surface, said inward and outward flow causing disintegration of at least a portion of the entrained solid particles.

16. A cyclone as set forth in claim 15, wherein said blowing arrangement gas flow disturber generates an inward-bound gas flow at a blowing angle in the range of from about 10 degrees to about 170 degrees relative to a plane tangential to said cyclone housing at a point of attachment of said blowing arrangement gas flow disturber to said cylindrical housing and a plane running parallel to said axis, said blowing angle extending radially therefrom through said tangential plane.

17. A cyclone as set forth in claim 15, wherein said blowing arrangement gas flow disturber comprises an air blowing duct disposed on said internal cylindrical surface.

18. A cyclone as set forth in claim 15, wherein said blowing arrangement gas flow disturber comprises an air jet nozzle or an air jet slit or both.

19. A cyclone as set forth in claim 15, wherein said blowing arrangement gas flow disturber comprises of an air blowing chamber disposed on an outer side of said cylindrical housing.

20. A cyclone as set forth in claim 19, further comprising of a jet nozzle or a jet slit disposed to said internal cylindrical surface.

* * * * *